(12) United States Patent
Tang

(10) Patent No.: US 10,996,073 B2
(45) Date of Patent: May 4, 2021

(54) NAVIGATION SYSTEM WITH ABRUPT MANEUVER MONITORING MECHANISM AND METHOD OF OPERATION THEREOF

(75) Inventor: Ky Tang, Milpitas, CA (US)

(73) Assignee: Telenav, Inc., Santa Clara, CA (US)

( * ) Notice: Subject to any disclaimer, the term of this patent is extended or adjusted under 35 U.S.C. 154(b) by 1215 days.

(21) Appl. No.: 12/959,305

(22) Filed: Dec. 2, 2010

(65) Prior Publication Data
US 2012/0143493 A1 Jun. 7, 2012

(51) Int. Cl.
*G01C 21/36* (2006.01)
*G01C 21/34* (2006.01)

(52) U.S. Cl.
CPC ..... *G01C 21/3697* (2013.01); *G01C 21/3407* (2013.01)

(58) Field of Classification Search
USPC ..... 701/1, 70, 99, 117, 118, 119, 29.1, 32.2, 701/32.3, 32.5, 33.4, 400, 424, 466, 300, 701/301, 302; 340/905, 438, 436, 901
See application file for complete search history.

(56) References Cited

U.S. PATENT DOCUMENTS

| | | | |
|---|---|---|---|
| 3,947,815 A * | 3/1976 | Muncheryan | B60Q 1/503 340/575 |
| 4,740,045 A * | 4/1988 | Goodson | G01S 7/023 342/112 |
| 5,430,432 A | 7/1995 | Camhi et al. | |
| 5,594,432 A | 1/1997 | Oliva et al. | |
| 5,798,695 A | 8/1998 | Metalis et al. | |
| 5,872,526 A | 2/1999 | Tognazzini | |
| 6,275,773 B1 | 8/2001 | Lemelson et al. | |
| 6,470,272 B2 | 10/2002 | Cong et al. | |
| 6,587,074 B1 * | 7/2003 | Winter | G01S 13/34 342/109 |
| 6,771,176 B2 | 8/2004 | Wilkerson | |
| 6,813,561 B2 | 11/2004 | MacNeille et al. | |
| 6,862,527 B2 | 3/2005 | Okamura et al. | |
| 6,909,947 B2 * | 6/2005 | Douros | G07C 5/0808 701/34.4 |
| 6,982,635 B2 | 1/2006 | Obradovich | |
| 7,188,014 B1 * | 3/2007 | Liao | B60R 1/00 362/494 |
| 7,292,152 B2 * | 11/2007 | Torkkola | G08B 21/06 340/426.2 |
| 7,584,047 B2 | 9/2009 | Igarashi et al. | |
| 7,859,392 B2 * | 12/2010 | McClellan | G01S 5/0027 340/441 |
| 7,982,620 B2 * | 7/2011 | Prokhorov | B60K 28/066 340/576 |

(Continued)

OTHER PUBLICATIONS

International Search Report for PCT Application No. PCT/US2011/057845 dated Mar. 16, 2012.

*Primary Examiner* — Rami Khatib
(74) *Attorney, Agent, or Firm* — Perspectives Law Group, Corp.

(57) ABSTRACT

A method of operation of a navigation system includes: detecting a vehicle abrupt maneuver; scanning a vehicle environment for a road hindrance; identifying a cause of the vehicle abrupt maneuver based on the vehicle environment; determining a classification as a provoked maneuver or an unprovoked maneuver based on the cause; and generating a message based on the classification and the cause for displaying on a device.

20 Claims, 6 Drawing Sheets

(56) References Cited

U.S. PATENT DOCUMENTS

| | | | |
|---|---|---|---|
| 8,188,887 B2* | 5/2012 | Catten | G06F 17/30241 340/425.5 |
| 2003/0095140 A1* | 5/2003 | Keaton | G06F 3/011 715/700 |
| 2005/0055150 A1* | 3/2005 | Uhler | B60K 31/0008 701/93 |
| 2005/0192746 A1* | 9/2005 | King | G01C 21/26 701/468 |
| 2005/0278118 A1 | 12/2005 | Kim | |
| 2006/0092043 A1* | 5/2006 | Lagassey | G07C 5/0891 340/907 |
| 2006/0111841 A1* | 5/2006 | Tseng | B60R 1/00 701/301 |
| 2007/0025596 A1* | 2/2007 | Ravier | B60Q 1/0023 382/104 |
| 2007/0032929 A1* | 2/2007 | Yoshioka | G07C 5/008 701/33.4 |
| 2007/0100521 A1 | 5/2007 | Grae | |
| 2007/0233353 A1* | 10/2007 | Kade | B60T 7/22 701/96 |
| 2008/0105482 A1 | 5/2008 | Yamaguchi et al. | |
| 2008/0285010 A1* | 11/2008 | Shoji | G01S 7/4811 356/5.01 |
| 2009/0135049 A1* | 5/2009 | Kikuchi | B60W 30/17 342/70 |
| 2009/0207046 A1* | 8/2009 | Arrighetti | G08G 1/04 340/937 |
| 2009/0312889 A1* | 12/2009 | Krupadanam | B60L 11/1859 701/1 |
| 2010/0066587 A1* | 3/2010 | Yamauchi | G05D 1/0044 342/70 |
| 2010/0076621 A1* | 3/2010 | Kubotani | G08G 1/166 701/1 |
| 2010/0174479 A1 | 7/2010 | Golding et al. | |
| 2010/0182164 A1* | 7/2010 | Diba | G08G 1/095 340/907 |
| 2010/0207787 A1* | 8/2010 | Catten | G06F 17/30241 340/905 |
| 2010/0235035 A1* | 9/2010 | Nishira | B60T 7/22 701/31.4 |
| 2012/0050093 A1* | 3/2012 | Heilmann | G01S 7/4004 342/173 |
| 2012/0265391 A1* | 10/2012 | Letsky | A01D 34/008 701/25 |

* cited by examiner

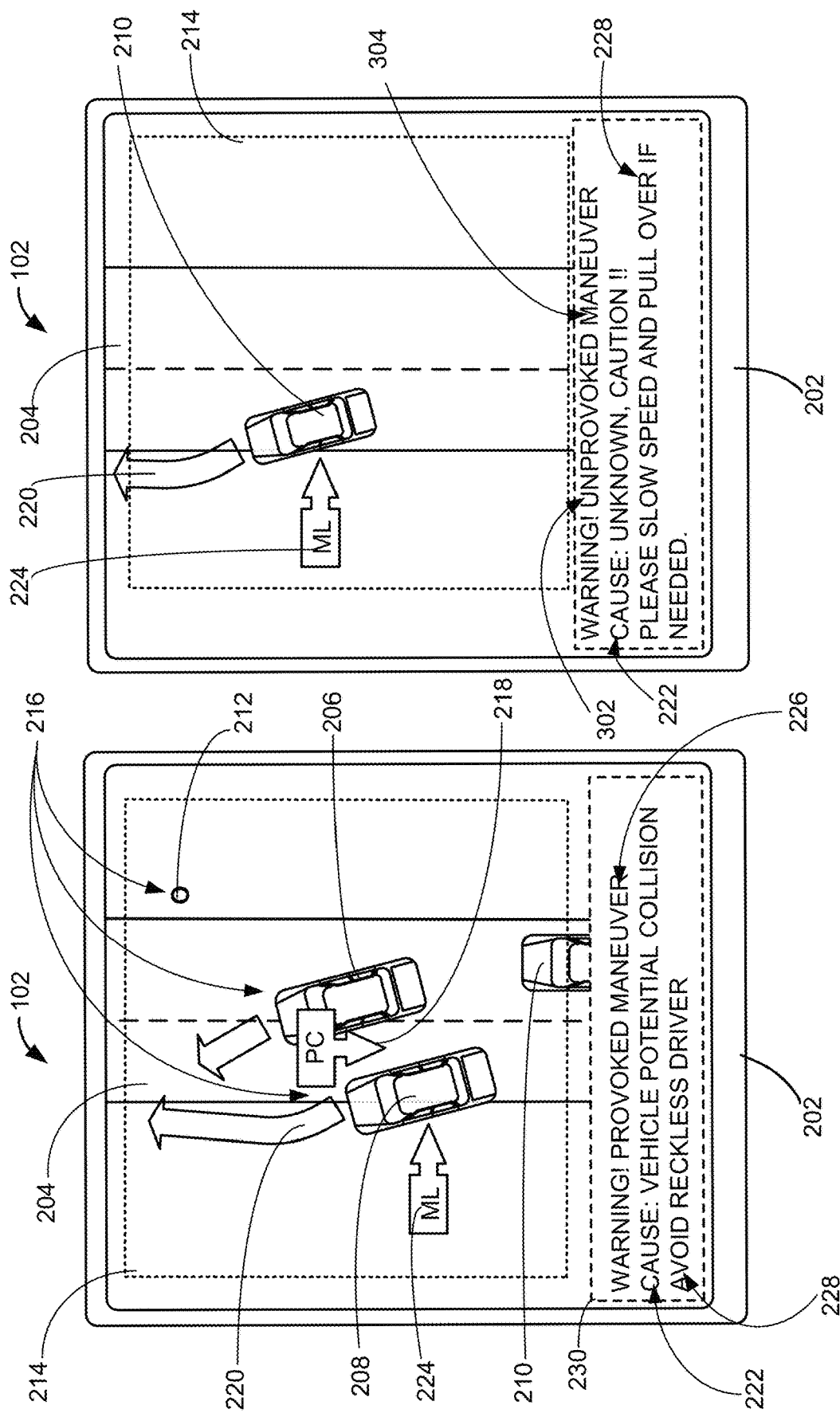

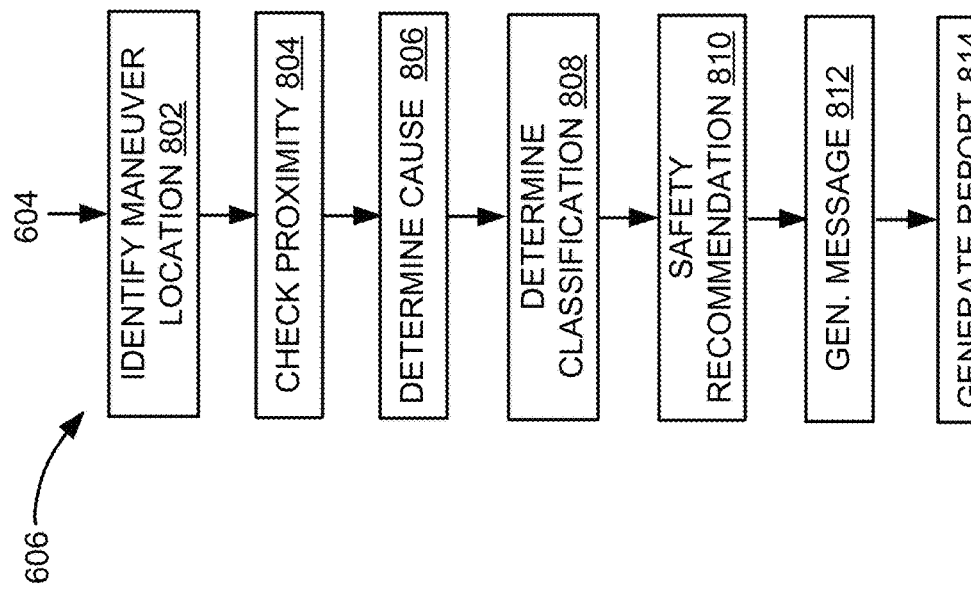
FIG. 8
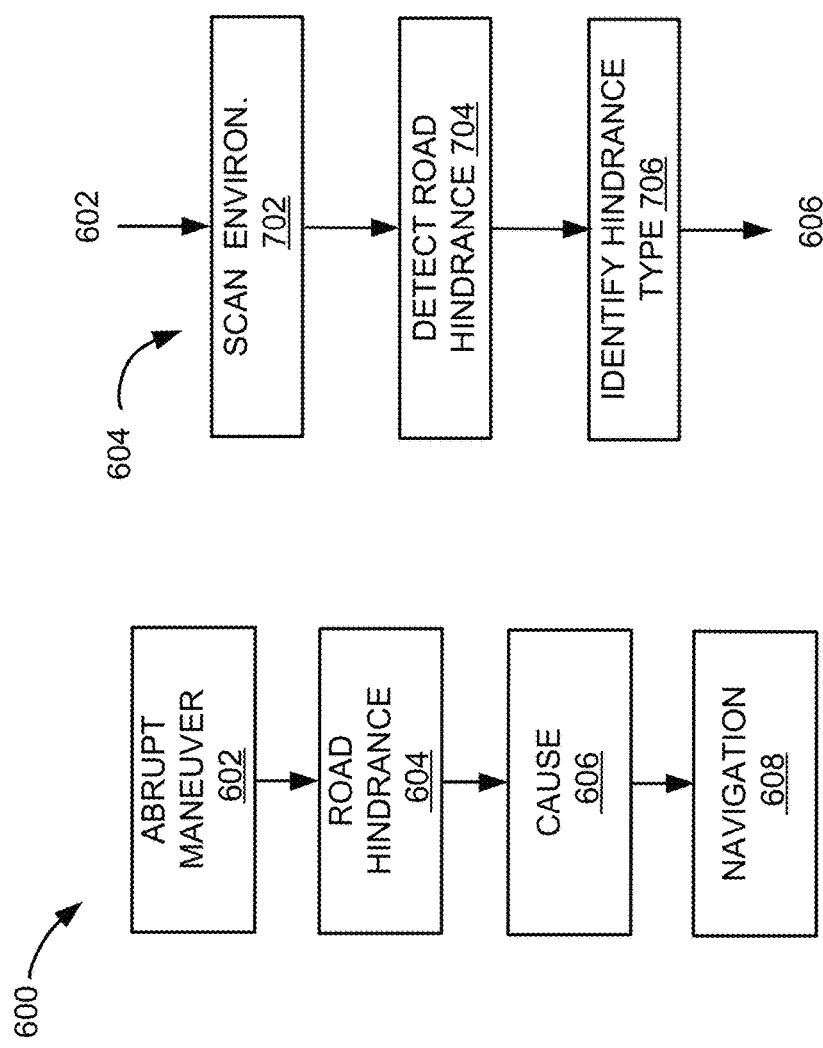
FIG. 7
FIG. 6

NAVIGATION SYSTEM WITH ABRUPT MANEUVER MONITORING MECHANISM AND METHOD OF OPERATION THEREOF

TECHNICAL FIELD

The present invention relates generally to a navigation system and more particularly to a navigation system with abrupt maneuver monitoring mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone or a personal digital assistant (PDA).

Location based services allow users to create, transfer, store, and/or consume information that affects the "real world". One such use of location-based services is to provide increased safety features for vehicles.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

In response to consumer demand, navigation systems are providing ever-increasing functionality. Current navigations systems lack features that include the monitoring of driver actions in making recommendations based on safety. By monitoring driver actions, driver can have advance warning to potential dangers on the road. The lack of these features entails safety risks. Tools that can monitor and analyze driver actions and behavior can decrease accidents and reduce costs.

Thus, a need still remains for a navigation system with abrupt maneuver monitoring mechanism providing low cost, improved functionality, and improved reliability. In view of the ever-increasing need to save costs and improve efficiencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: detecting a vehicle abrupt maneuver; scanning a vehicle environment for a road hindrance; identifying a cause of the vehicle abrupt maneuver based on the vehicle environment; determining a classification as a provoked maneuver or an unprovoked maneuver based on the cause; and generating a message based on the classification and the cause for displaying on a device.

The present invention provides a navigation system, including: an abrupt maneuver module, for detecting a vehicle abrupt maneuver; a road hindrance module, coupled to the abrupt maneuver module, for scanning a vehicle environment for a road hindrance; a determine cause module, coupled to the road hindrance module, for identifying a cause of the vehicle abrupt maneuver based on the vehicle environment; a determine classification module, coupled to the determine cause module, for determining a classification as a provoked maneuver or an unprovoked maneuver based on the cause; and a generate message module, coupled to the determine classification module, for generating a message based on the classification and the cause for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 2 is a first example of a display interface of the first device.

FIG. 3 is a second example of the display interface.

FIG. 6 is a control flow of a method of operation of the navigation system.

FIG. 7 is a detailed view of the road hindrance module.

FIG. 8 is a detailed view of the cause module.

BEST MODE FOR CARRYING OUT THE INVENTION

Figure 1:
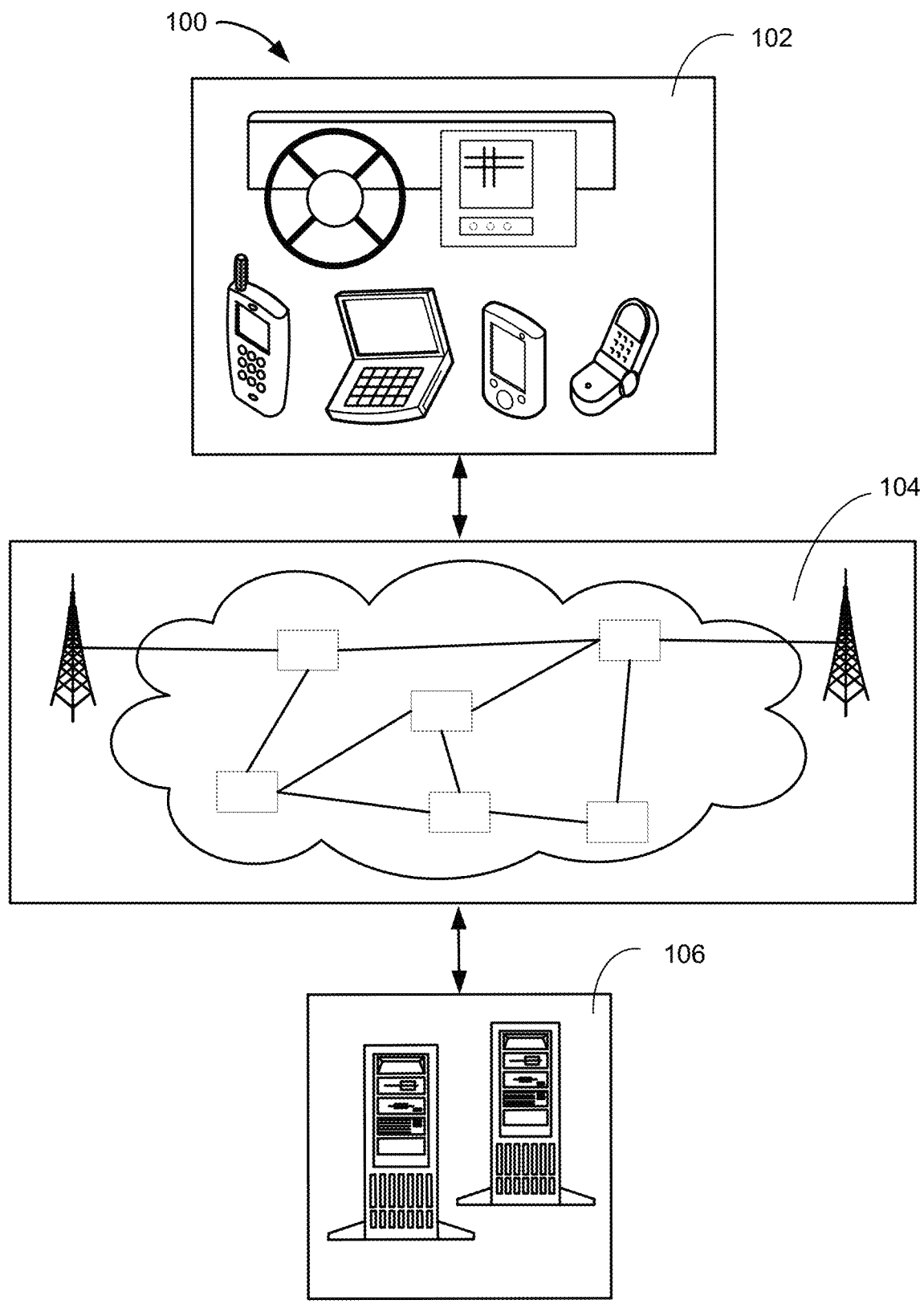
FIG. 1 is a navigation system with abrupt maneuver monitoring mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with abrupt maneuver mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telemetric navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Referring now to FIG. 2, therein is shown a first example of a display interface 202 of the first device 102. The display interface 202 can depict a road 204 with three moving vehicles on the road 204. The road 204 is defined as a path made for traveling motor vehicles. The geographic location of the road can be depicted on the display interface 202.

A lane-changing vehicle 206 is defined as a vehicle that is merging into a different lane than the vehicle's current lane. The lane-changing vehicle 206 is depicted as merging into the left lane of the road 204 on the display interface 202.

A provoked vehicle 208 is defined as a vehicle that swerves or makes a sudden driving maneuver to avoid an external object. For example, the provoked vehicle 208 is depicted as swerving to avoid the lane-changing vehicle 206 on the display interface 202.

A navigating vehicle 210 is defined as a vehicle equipped with the first device 102, such as a portable or built in navigation system. The navigating vehicle 210 can be depicted as following behind the lane-changing vehicle 206 and the provoked vehicle 208 on the display interface 202. The navigating vehicle 210 can receive alerts to approaching road hazards that can be displayed on the display interface 202.

The display interface 202 can also depict a pedestrian 212 and a vehicle environment 214. The pedestrian 212 is defined as a person who travels by foot. The vehicle environment 214 is defined as a geographical region around the lane-changing vehicle 206, the provoked vehicle 208, the navigating vehicle 210, or a combination thereof that is monitored for vehicles and used for detecting objects near the road 204.

A road hindrance 216 is defined as an object on the road 204 that can create a dangerous situation by causing a potential collision 218. The potential collision 218 is defined by the situation where two objects can collide on the road 204 due to the road hindrance 216.

For example, from the point of view of the navigating vehicle 210, the lane-changing vehicle 206, the provoked vehicle 208, and the pedestrian 212 are all examples of the road hindrance 216 because these objects can cause the potential collision 218. The potential collision 218 can be caused by the navigating vehicle 210 colliding with the lane-changing vehicle 206, the provoked vehicle 208, or the pedestrian 212. The potential collision 218 can also be caused by the lane-changing vehicle 206, the provoked vehicle 208, or the pedestrian 212 colliding with each other and creating an accident that is in front of the navigating vehicle 210.

The display interface 202 shows the different examples of the road hindrance 216 that are in front of the navigating vehicle 210. The road hindrance 216 can also be a vehicle or object that can collide with the navigating vehicle 210 from behind or from the sides of the navigating vehicle 210.

A vehicle abrupt maneuver 220 is defined as an abrupt action taken by a driver such as swerving or heavy breaking. The display interface 202 depicts the provoked vehicle 208 making the vehicle abrupt maneuver 220 as the provoked vehicle 208 swerves to avoid the lane-changing vehicle 206. The navigation system 100 can detect the vehicle abrupt maneuver 220 from any vehicle within the sensor range of the navigation system 100.

For example, the vehicle abrupt maneuver 220 can also come from the navigating vehicle 210 or from vehicles in proximity to the navigating vehicle 210. For example, the navigation system 100 can detect the vehicle abrupt maneuver 220 from the navigating vehicle 210 or from any vehicles in the vehicle environment 214. The vehicle abrupt maneuver 220 can be detected through motion sensors, cameras, accelerometers, or a combination thereof. The vehicle abrupt maneuver 220 will be explained in further detail below.

The navigation system 100 can also identify a cause 222 for the vehicle abrupt maneuver 220. The cause 222 is defined as an explanation or a reason for the vehicle abrupt maneuver 220. For example, the lane-changing vehicle 206 can be the cause 222 of the vehicle abrupt maneuver 220 made by the provoked vehicle 208. The cause 222 can be identified by detecting a maneuver location 224 and identifying the road hindrance 216 near the maneuver location 224 that may have provoked the vehicle abrupt maneuver 220.

The maneuver location 224 is defined as the geographic location where the vehicle abrupt maneuver 220 occurred. The navigation system 100 can use the maneuver location 224 and the location of the road hindrance 216 to identify the cause 222 of the vehicle abrupt maneuver 220. For example, if the road hindrance 216 is one mile apart from the maneuver location 224, the navigation system 100 can identify that the road hindrance 216 was unlikely the cause 222 of the vehicle abrupt maneuver 220 because of the distance between the locations.

In this example, the driver is swerving or driving erratically without any external objects near the vehicle. The driver making the vehicle abrupt maneuver 220 may be falling asleep at the wheel or intoxicated and these conditions can cause the vehicle abrupt maneuver 220 that is unprovoked by an external object from the vehicle.

A provoked maneuver 226 is defined as a situation where the vehicle making the vehicle abrupt maneuver 220 swerves or abruptly avoids the road hindrance 216. The navigation system 100 can detect the provoked maneuver 226 by detecting the potential collision 218 to determine the probability of the occurrence of the provoked maneuver 226.

For example, on the display interface 202, the lane-changing vehicle 206 is depicted as merging in front of the provoked vehicle 208 and almost causing an accident. The provoked vehicle 208 can be depicted as swerving to avoid the lane-changing vehicle 206. The lane-changing vehicle 206 can represent the road hindrance 216 that causes the provoked vehicle 208 into making the provoked maneuver 226. The detection of the provoked maneuver 226 will be further explained below.

A safety recommendation 228 is defined as a notification that provides advice to avoid a dangerous driving situation. The content of the safety recommendation 228 can be generated based on the cause 222, the road hindrance 216, the vehicle environment 214, or a combination thereof. For example, the navigation system 100 can analyze the vehicle environment 214 and the cause 222 for generating the content of the safety recommendation 228. If the road hindrance 216 is determined to be the cause 222 of the vehicle abrupt maneuver 220, the safety recommendation 228 can recommend avoiding the road hindrance 216. The safety recommendation 228 can also suggest that the driver of the navigating vehicle 210 take actions like to slow down, to pull over, and to rest.

A message 230 is defined as an alert to the driver of the navigating vehicle 210. The message 230 can display information including the cause 222, and the safety recommendation 228.

Referring now to FIG. 3, therein is shown a second example of the display interface 202. The display interface 202 can depict the road 204, the navigating vehicle 210, and the vehicle abrupt maneuver 220 of FIG. 2. The display interface 202 can also depict the maneuver location 224, the safety recommendation 228, and the vehicle environment 214 of FIG. 2. The display interface 202 can also depict an unprovoked maneuver 302 and a classification 304.

The display interface 202 depicts an example where the navigating vehicle 210 is the vehicle that is making the vehicle abrupt maneuver 220. The navigating vehicle 210 is depicted as being on the left side of the road 204. In this example, the display interface 202 shows the navigating vehicle 210 alone on the road 204. This example does not include any objects or other examples of the road hindrance 216 of FIG. 2 around the navigating vehicle 210.

The vehicle abrupt maneuver 220 can include the unprovoked maneuver 302 as a type of the vehicle abrupt maneuver 220. The unprovoked maneuver 302 is defined as a situation where the vehicle abrupt maneuver 220 was not forced by the road hindrance 216. The detection of the unprovoked maneuver 302 will be further explained below.

For example, on the display interface 202, the navigating vehicle 210 is making the unprovoked maneuver 302 because the navigating vehicle 210 is alone on the road 204. The unprovoked maneuver 302 represents the vehicle abrupt maneuver 220 that was not forced by the road hindrance 216. This situation can suggest that the driver of the navigating vehicle 210 is experiencing a problem because the navigating vehicle 210 is alone on the road 204. For example, the safety recommendation 228 for this situation can recommend that the driver of the navigating vehicle 210 should slow down and pull over to rest.

The classification 304 is defined as a grouping of the cause 222 of the vehicle abrupt maneuver 220 into two categories that can be used to determine the safety recommendation 228. The classification 304 is grouped into the unprovoked maneuver 302 or the provoked maneuver 226 of FIG. 2. If the navigation system 100 determines the classification 304 of the unprovoked maneuver 302, the navigation system 100 can generate a different warning for the safety recommendation 228 than the classification 304 of the provoked maneuver 226.

For example, the classification 304 of the unprovoked maneuver 302 can suggest that the driver's condition, such as driver fatigue or intoxication, can be the cause 222 for the vehicle abrupt maneuver 220. If the navigation system 100 cannot detect the road hindrance 216 to be the cause 222 of the vehicle abrupt maneuver 220, the navigation system 100 can determine the unprovoked maneuver 302, which will be discussed in more details later. The navigation system 100 can use the classification 304 and the cause 222 to provide specific warnings based on the situation.

Figure 4:
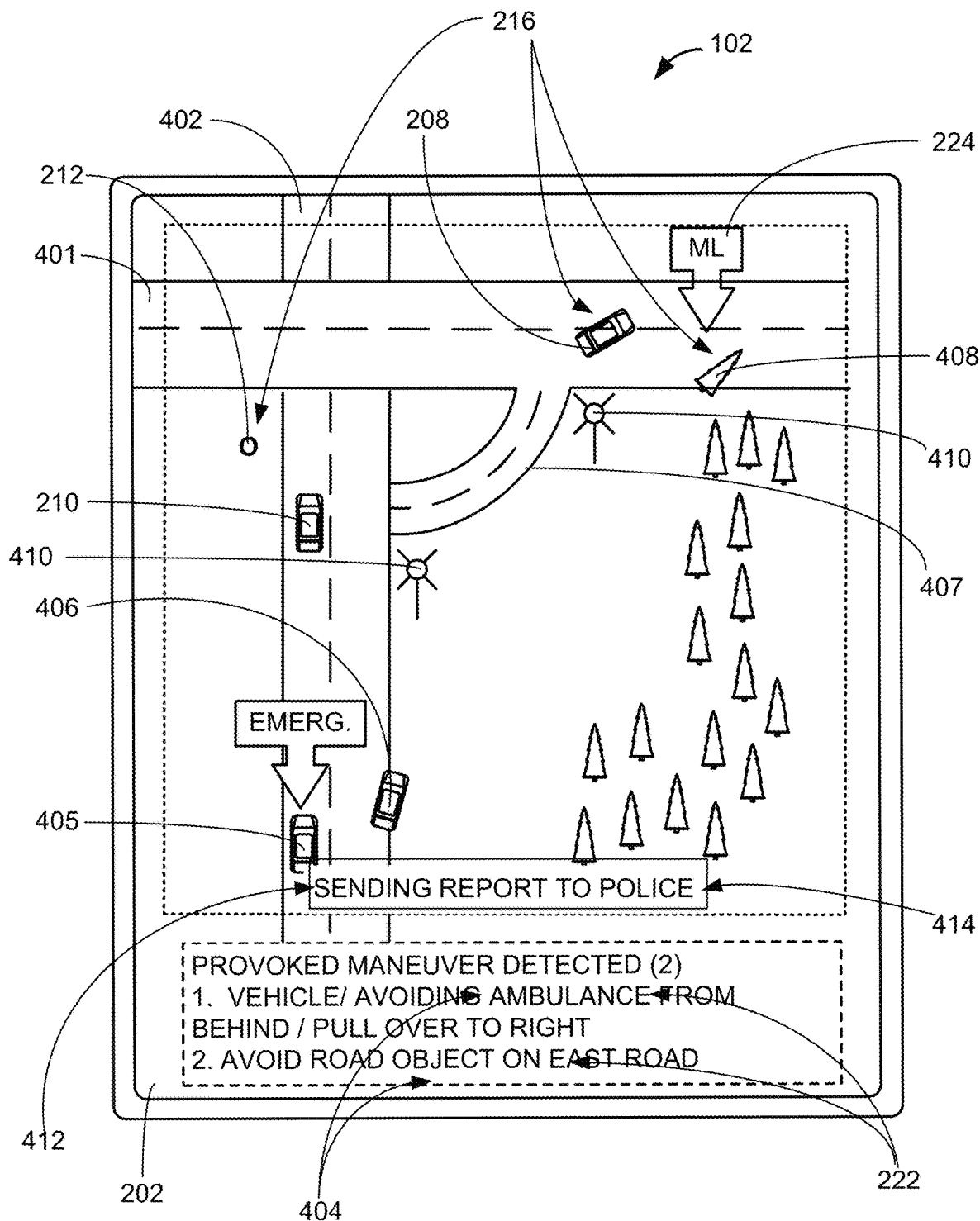
FIG. 4 is a third example of the display interface.

Referring now to FIG. 4, therein is shown a third example of the display interface 202. The display interface 202 can depict the vehicle environment 214 of FIG. 2 with a large coverage area around the navigating vehicle 210. The display interface 202 can display an example that includes the vehicle environment 214 with a highway 401 that is perpendicular to a street 402.

The highway 401 is defined as an express road with no intersections. The display interface 202 depicts that the highway 401 is connected to the street by an onramp 407. The onramp 407 is defined as a path from a street that leads to a entrance of the highway 401.

The display interface 202 can also depict the provoked vehicle 208, the navigating vehicle 210, the pedestrian 212, and the cause 222. The display interface 202 can also depict a hindrance type 404, and an emergency vehicle 405. The display interface 202 can also depict a second provoked vehicle 406, a road object 408 as a specific example of the road hindrance 216, a safety camera 410, a report 412, and a recipient 414.

The emergency vehicle 405 is defined as a vehicle that is designated and authorized to respond to an emergency and is often authorized to operate by a governmental agency. For example, an ambulance, fire truck, or police vehicle can be the emergency vehicle 405. The display interface 202 depicts the emergency vehicle 405 as approaching from the bottom on the display interface 202. The emergency vehicle 405 can be equipped with radio frequency identification (RFID) so that the location of the emergency vehicle 405 can be detected and displayed on the display interface 202. The second provoked vehicle 406 is defined as a vehicle that is pulled over to the side of the street 402 after making the vehicle abrupt maneuver 220 in response to the emergency vehicle 405.

The hindrance type 404 can represent a category for identifying the road hindrance 216. For example, the navigation system 100 can identify the hindrance type 404 of the road hindrance 216 to provide specific warning of an approaching object. For example, the hindrance type 404 can warn a driver to look out for a vehicle, an obstruction, or the pedestrian 212 that might be a source of a potential accident. The hindrance type 404 can include the following categories: vehicles, pedestrians, obstruction on the road, and emergency vehicles.

The hindrance type 404 can include the road object 408 as a category of identifiable objects on the roadway. The road object 408 is defined as an object on the roadway that can cause the potential collision 218 of FIG. 2 that is not detected as the pedestrian 212 or a vehicle. For example, the road object 408 can represent a tree or telephone pole that has fallen onto the highway 401. The road object 408 is a category of the road hindrance 216.

Further, for example, the navigation system 100 can detect the road object 408 on the roadways through vehicle or device equipped sensors such as radar, sonar, and cameras. Sensor can also be mounted on towers along specific geographic regions to detect vehicles, pedestrians, and the road object 408. Radar mounted on a vehicle or navigation device can be used to detect objects such as fallen trees and people on the highway 401. Sensor towers can be used to detect the location of the pedestrian 212. Cameras can be mounted on vehicles and towers to help identify vehicles, pedestrians, and objects. Information on the road hindrance 216 can be collected and displayed on the display interface 202.

The safety camera 410 is defined as a surveillance device that monitors vehicles on streets and roads. For example, the safety camera 410 can be a freeway traffic camera or a surveillance device mounted on the vehicle or the first device 102 of FIG. 1. The safety camera 410 can be mounted on towers and can be equipped with motions sensors, radio receivers, sonar, or a combination thereof. The safety camera 410 can be operated by a municipal transportation agency. The safety camera 410 can also be operated by the navigation system 100.

The navigation system 100 can request information from the safety camera 410 for monitoring a vehicle after the provoked maneuver 226 or the unprovoked maneuver 302 of FIG. 3. For example, after the unprovoked maneuver 302, the safety camera 410 can be used to monitor a vehicle for potential drunk driving. After the provoked maneuver 226, the safety camera 410 can be used to monitor for the road hindrance 216 that forced the provoked maneuver 226.

The safety camera 410 can also be used to assist the navigation system 100 in identifying the hindrance type 404. For example, the safety camera 410 can take pictures of the road object 408. The pictures and images of roadways can be used to identify the road object 408 such as a fallen tree on the highway 401.

The report 412 is define as message that includes information that contains the cause 222, the classification 304, the road hindrance 216, the maneuver location 224, the hindrance type 404, and the time of the vehicle abrupt maneuver 220 to the recipient 414. The recipient 414 is defined as an interested party such as a parent, an insurance company, an employer, legal authorities, or a combination thereof. For example, on the display interface 202, the report 412 is depicted as being submitted to the police.

The report 412 can be used as information or evidence in insurance claims and for employer or parental supervision. The report 412 can alert public and legal authorities to potential road dangers on the street 402 and on the highway 401. For example, after receiving the report 412, the police can remove the road object 408 from the highway 401.

Figure 5:
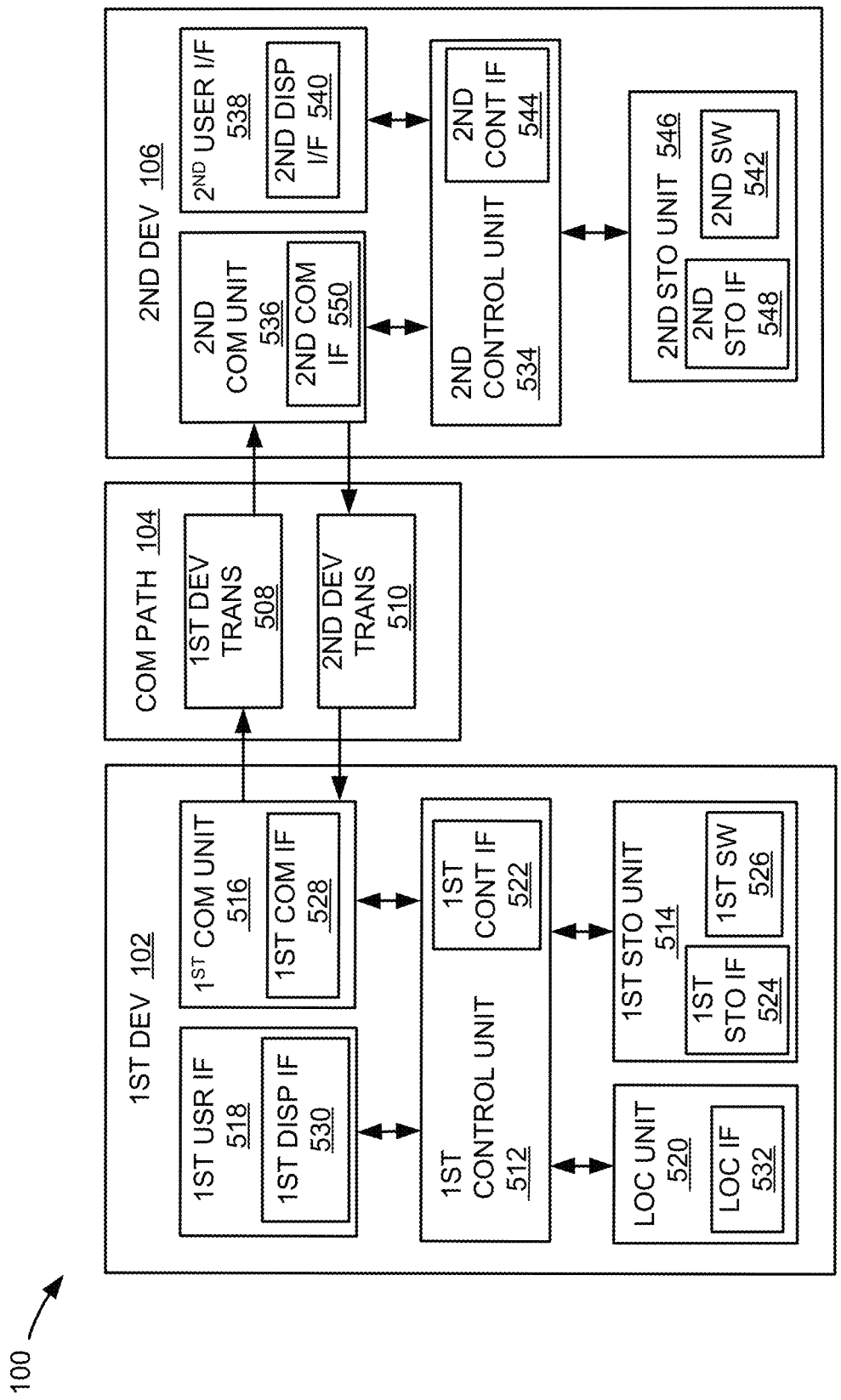
FIG. 5 is an exemplary block diagram of the navigation system.

Referring now to FIG. 5, therein is shown an exemplary block diagram of the navigation system 100. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first device 102 of FIG. 5 can be similarly described by the first device 102 of FIG. 1.

The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations external to the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the first display interface 530 can include the display interface 202 of FIG. 2. The first display interface 530 can include a display, a projector, a video screen, a speaker, or any combination thereof. The screenshot shown on the display interface 202 described in FIG. 2 can represent an example of a screenshot for the navigation system 100.

The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Referring now to FIG. 6, therein is shown a control flow of the navigation system 100. The navigation system 100 can include an abrupt maneuver module 602, a road hindrance module 604, a cause module 606, and a navigation module 608. In the navigation system 100, as an example, each module is indicated by a number and successively higher module numbers follow one another. Control flow can pass from one module to the next higher numbered module unless explicitly otherwise indicated.

The abrupt maneuver module 602 monitors for abrupt movements and maneuvers made by a vehicle to determine if the vehicle abrupt maneuver 220 of FIG. 2 has occurred. The navigation system 100 can detect the vehicle abrupt maneuver 220 for the purpose of determining potential threats on the roadways. For example, if the abrupt maneuver module 602 detects the vehicle abrupt maneuver 220, the navigation system 100 can attempt to identify the source of the vehicle abrupt maneuver 220 and can provided advance warning to a driver to avoid potential danger.

For example, the abrupt maneuver module 602 can detect the vehicle abrupt maneuver 220 by using sensors in the vehicle, accelerometers, tracking signals, video cameras, and radio frequency identification (RFID). The abrupt maneuver module 602 can use an accelerometer to detect when the navigating vehicle 210 of FIG. 3 swerves on the road 204 of FIG. 3.

Further, for example, the vehicle abrupt maneuver 220 can be detected by monitoring the vehicle's course and trajectory. While monitoring the vehicle's course, the abrupt maneuver module 602 can use an accelerometer to determine that sudden jerks and swerving is the vehicle abrupt maneuver 220. The abrupt maneuver module 602 can distinguish the vehicle abrupt maneuver 220 from a normal sharp turn by analyzing the vehicle's trajectory after the maneuver. If the vehicle swerves or makes a sudden jerking motion and then returns to traveling straight, the abrupt maneuver module 602 can determine that the vehicle abrupt maneuver 220 just occurred. If the vehicle's course after the sharp turn is consistent with a turn, the abrupt maneuver module 602 can identify a turn instead of the vehicle abrupt maneuver 220.

The abrupt maneuver module 602 can also use the maneuver location 224 of FIG. 2 and map information to help differentiate the vehicle abrupt maneuver 220 from a sharp turn. If the vehicle abrupt maneuver 220 occurs at a point before a turn or curve on a map, the abrupt maneuver module 602 can determine a sharp turn occurred after analyzing the vehicle trajectory information. If the maneuver location 224 occurs on a straight street without any nearby curves or turns, the abrupt maneuver module 602 can assess that the vehicle abrupt maneuver 220 has occurred.

The abrupt maneuver module 602 can also request information from sensor towers or other sensors along the roadways for detecting the vehicle abrupt maneuver 220. For example, sensor towers can be equipped with radar, motion sensors, and cameras for detecting and monitoring trajectory, course, swerving, and hard braking from vehicles on the road. The safety camera 410 of FIG. 4 can be an example of a sensor tower.

The road hindrance module 604 scans the vehicle environment 214 of FIG. 4 for obstacles on streets and roads such as the road hindrance 216 of FIG. 4. The road hindrance module 604 can use different methods to scan the vehicle environment 214 for the road hindrance 216. For example, the road hindrance module 604 can scan for vehicles and pedestrians that are appropriately equipped with radio frequency identification. Radar, cameras, or a combination thereof can also be used to scan the vehicle environment 214 for vehicles, pedestrians, and other objects on the roads. The road hindrance module 604 will be explained in further detail below.

The cause module 606 identifies the cause 222 of FIG. 2 and the classification 304 of FIG. 3 to provide warnings to a driver of potential road hazards. The cause module 606 can use the vehicle environment 214, the maneuver location 224, and the road hindrance 216 to determine the cause 222 and the classification 304. The navigation system 100 can use the cause 222 and the classification 304 to generate appropriate driver safety information. The cause module 606 will be explained in further detail below. The navigation module 608 generates and display routes, and can provide instructions for navigating to destinations.

The physical transformation from detecting and monitoring the vehicle abrupt maneuver 220 results in movement in the physical world, such as people using the first device 102, the vehicle, or a combination thereof, based on the operation of the navigation system 100. The detection of the vehicle abrupt maneuver 220 can allow the navigation system 100 to identity the road hindrance 216 that may have caused the vehicle abrupt maneuver 220. The navigation system 100 can generate the safety recommendation 228 of FIG. 2 to modify the driver's behavior. As the movement in the physical world occurs, the movement itself creates additional information that is converted back to the continued operation of the navigation system 100 and to continue the movement in the physical world.

The navigation system 100 can be implemented on the first device 102 of FIG. 5, on the second device 106 of FIG. 5, or partitioned between the first device 102 and the second device 106. An example for the first device 102 can have the first software 526 of FIG. 5 include the abrupt maneuver module 602, the road hindrance module 604, the cause module 606, and the navigation module 608 of FIG. 6. The first control unit 512 of FIG. 5 can execute the first software 526.

For example, the abrupt maneuver module 602 can use the first control unit 512, the location unit 520 of FIG. 5, or a combination thereof to monitor for the vehicle abrupt maneuver 220 of FIG. 2. The abrupt maneuver module 602 can use the first control unit 512 to determine if the vehicle abrupt maneuver 220 has occurred. The abrupt maneuver module 602 can use the location unit 520 to detect the maneuver location 224 of FIG. 2 on a map.

The first control unit 512 can also execute the road hindrance module 604 and the cause module 606. This will be explained in detail below. The navigation module 608 can use the first control unit 512, the first communication unit 516 of FIG. 5, the location unit 520, or a combination thereof to generate routes for navigation. The navigation module 608 can also use the first display interface 530 of FIG. 5 to display the route.

An example for the second device 106 can have the second software 542 of FIG. 5 include the abrupt maneuver module 602, the road hindrance module 604, the cause module 606, and the navigation module 608 of FIG. 6. The second control unit 534 of FIG. 5 can execute the second software 542.

For example, the abrupt maneuver module 602 can use the first control unit 512 to determine if the vehicle abrupt maneuver 220 has occurred. The second control unit 534 can also execute the road hindrance module 604 and the cause module 606. This will be explained in detail below. The navigation module 608 can use the second control unit 534, the second communication unit 536 of FIG. 5, or a combination thereof to generate routes for navigation.

In another example, the navigation system 100 can be partitioned into functional units of the first device 102 of FIG. 5, the second device 106 of FIG. 5, or a combination thereof. For example, the navigation system 100 can be partitioned between the first software 526 and the second software 542.

The first software 526 can include the navigation module 608. The first control unit 512 can execute modules partitioned on the first software 526. For example, the navigation module 608 can use the first control unit 512, the first communication unit 516 of FIG. 5, or a combination thereof to generate routes for navigation.

The second software 542 can include the abrupt maneuver module 602, the road hindrance module 604, and the cause module 606 that are partitioned on the second device 106. The second control unit 534 can execute modules partitioned on the second software 542. For example, the abrupt maneuver module 602 can use the first control unit 512 to determine if the vehicle abrupt maneuver 220 has occurred. The second control unit 534 can also execute the road hindrance module 604 and the cause module 606. This will be explained in detail below. The navigation module 608 can use the second control unit 534, the second communication unit 536 of FIG. 5, or a combination thereof to generate routes for navigation.

The navigation system 100 describes the module functions or order as an example. The modules can be partitioned differently. For example, the abrupt maneuver module 602, the road hindrance module 604, the cause module 606, and the navigation module 608 can be implemented as one module or with lesser number of modules. Each of the modules can operate individually and independently of the other modules.

It has been discovered that the present invention provides the navigation system 100 with abrupt maneuver monitoring mechanism for providing safe navigation by identifying the cause 222 to the vehicle abrupt maneuver 220. The navigation system 100 can detect potential hazards on the road 204 by detecting the vehicle abrupt maneuver 220 from vehicles around the navigating vehicle 210 of FIG. 2. The navigation system 100 can identify the cause 222 of the vehicle abrupt maneuver 220 to give drivers specific warnings of upcoming road hazards.

Referring now to FIG. 7, therein is shown a detailed view of the road hindrance module 604. The road hindrance module 604 can scan the vehicle environment 214 of FIG. 2 to detect and identify the road hindrance 216 of FIG. 2. The road hindrance module 604 can include a scan environment module 702, a detect road hindrance module 704, and an identify hindrance type module 706.

The modules within the road hindrance module 604, as an example, can be indicated by a number and successively higher module numbers follow one another. Control flow can pass from one module to the next higher numbered module unless explicitly otherwise indicated.

The scan environment module 702 scans the vehicle environment 214 for detecting the road hindrance 216. The scan environment module 702 can use vehicle equipped radar, sonar, cameras, or a combination thereof to detect the road hindrance 216 and other objects in the vehicle environment 214. The scan environment module 702 can also scan the vehicle environment 214 by requesting information from sensors along the roadway. For example, the scan environment module 702 can request information from municipal transportation agencies that can operate sensors along the road 204 of FIG. 2.

Vehicles and pedestrians can be equipped with radio frequency identification to determine their location in the vehicle environment 214. For example, the pedestrian 212 of FIG. 4 can be equipped with radio frequency identification. The scan environment module 702 can detect the location of the pedestrian 212 as on the side of the road 204 in the vehicle environment 214. The location of the pedestrian 212 and other vehicles can be displayed on the display interface 202 of FIG. 4.

The coverage size of the scan can be user-defined or automatically determined by the navigation system 100 of FIG. 1. Additionally, the scan of the vehicle environment 214 can include a geographic region in front of the navigating vehicle 210 of FIG. 2, a geographic region behind the navigating vehicle 210, a geographic region to the left of the navigating vehicle 210, to the right of the navigating vehicle 210, or a combination thereof.

The scanning range of the vehicle environment 214 can be used to filter the road hindrance 216 and the vehicle abrupt maneuver 220 that can be detected. For example, the driver of the navigating vehicle 210 can adjust the settings of the navigation system 100 to adjust the scanning range of the vehicle environment 214. In heavy traffic situations, the scanning range of the vehicle environment 214 can be adjusted to cover a short distance around the navigating vehicle 210. By scanning a short distance around the navigating vehicle 210, traffic hazards can be filtered out that are out of range while still provide warnings about immediate dangers.

The scan environment module 702 can also scan and monitor a large area for the vehicle environment 214. In very light traffic or night time situations, the navigation system 100 can provide warnings of potential traffic hazards that are far away from the navigating vehicle 210. The navigating vehicle 210 can be provided with advanced warning and extra time to avoid the road hindrance 216 that may be up ahead on the road 204.

The detect road hindrance module 704 detects the road hindrance 216 during the scan of the vehicle environment 214. For example, the detect road hindrance module 704 can use the information from the scan of the vehicle environment 214 to assess objects on the road 204 of FIG. 2. The detect road hindrance module 704 can detect objects near the road 204 or objects in the path of vehicles as the road hindrance 216.

The identify hindrance type module 706 can identify the hindrance type 404 of FIG. 4 for each of the road hindrance 216 that is detected. For example, the identify hindrance type module 706 can identify the road hindrance 216 as the pedestrian 212 of FIG. 2, the road object 408 of FIG. 4, or a vehicle if the pedestrian and vehicle are equipped with radio frequency identification.

The hindrance type 404 for the road hindrance 216 can also be identified by radar, sonar, cameras, or a combination thereof. For example, radar, sonar, cameras, or a combination thereof can detect the size and shape of the road hindrance 216 to differentiate between the pedestrian 212 and the road object 408. For example, the navigation system 100 can use sonar to detect an object on the road 204 of FIG. 4 that is shaped like a tree that has fallen on the road. The identify hindrance type module 706 can identify the tree as the road object 408.

In another example, the navigation system 100 can use radar to detect the silhouette of a human on the road 204 of FIG. 4. The hindrance type 404 can identify the radar image as belonging to the pedestrian 212 and the navigation system 100 can generate a warning of a possible pedestrian as the road hindrance 216. If the pedestrian 212 is equipped with a radio frequency identification tag, the identify hindrance type module 706 can detect the hindrance type 404 as the pedestrian 212.

The hindrance type 404 can be included in the message 230 of FIG. 2 to warn the driver of the navigating vehicle 210 about the hindrance type 404 of the road hindrance 216 to avoid. For example, the message 230 of FIG. 2 can include the hindrance type 404 to warn about the pedestrian 212 near the highway 401 of FIG. 4. The driver of the navigating vehicle 210 can look out for pedestrians instead of focusing on other vehicles as the source of the vehicle abrupt maneuver 220. The hindrance type 404 can also be the emergency vehicle 405. The message 230 can warn the driver of the navigating vehicle 210 to pull over to avoid the emergency vehicle 405.

For illustrative purposes, the modules of the road hindrance module 604 are described as discrete functional modules, although it is understood that these modules can have a different configuration. For example, the scan environment module 702, the detect road hindrance module 704, and the identify hindrance type module 706 can be implemented as one module or with lesser number of modules. Each of the modules can operate individually and independently of the other modules.

The road hindrance module 604 can be implemented on the first device 102 of FIG. 5, on the second device 106 of FIG. 5, or partitioned between the first device 102 and the second device 106. An example for the first device 102 can have the first software 526 of FIG. 5 include the identify maneuver location module 802, the check proximity module 804, the determine cause module 806, the determine classification module 808, the safety recommendation module 810, the generate message module 812, and the generate report module 814. The first control unit 512 can execute the first software 526.

The first software 526 can include the scan environment module 702, the detect road hindrance module 704, and the identify hindrance type module 706. The scan environment module 702 can use the first control unit 512 of FIG. 5 to scan and monitor the vehicle environment 214. The scan environment module 702 can use the first communication unit 516 of FIG. 5 to request information about the vehicle environment 214.

The detect road hindrance module 704 can use the first control unit 512 to detect the road hindrance 216. The identify hindrance type module 706 can use the first control unit 512 to identify the hindrance type 404.

An example for the second device 106 can have the second software 542 include the scan environment module 702, the detect road hindrance module 704, and the identify hindrance type module 706. The scan environment module 702 can use the second control unit 534 of FIG. 5 to monitor the vehicle environment 214. The scan environment module 702 can use the second communication unit 536 of FIG. 5 to request information about the vehicle environment 214.

The detect road hindrance module 704 can use the second control unit 534 to detect the road hindrance 216. The identify hindrance type module 706 can use the second control unit 534 to identify the hindrance type 404.

In another example, the road hindrance module 604 can be partitioned between the first device 102 of FIG. 5 and the second device 106 of FIG. 5. For example, the detect road hindrance module 704, and the identify hindrance type module 706 can be partitioned on the first device 102. The scan environment module 702 can be partitioned on the second device 106. The first control unit 512 can execute the detect road hindrance module 704 and the identify hindrance type module 706. The second control unit 534 can execute the scan environment module 702.

It has been discovered that the present invention provides the navigation system 100 with abrupt maneuver monitoring mechanism for providing safe navigation by detecting the hindrance type 404 of the road hindrance 216. The navigation system 100 can identify an object on the road 204 to provide a specific warning of the object to avoid. For example, the navigation system 100 can identify the emergency vehicle 405 that is approaching and provide a warning of the emergency vehicle 405 well in advance.

The navigation system 100 can also identify if the pedestrian 212, a vehicle, or other object is near the road. This information can help drivers avoid potential collisions and allow drivers to be more alert to possible sources of danger.

Referring now to FIG. 8, therein is shown a detailed view of the cause module 606. The cause module 606 identifies the cause 222 of FIG. 2 and the classification 304 of FIG. 3. The cause 222 and the classification 304 can provide safety information about potential dangers on roadways. The cause module 606 can include an identify maneuver location module 802, a check proximity module 804, a determine cause module 806, and a determine classification module 808.

The cause module 606 can also include a safety recommendation module 810, a generate message module 812, and a generate report module 814. The modules within the cause module 606, as an example, can be indicated by a number and successively higher module numbers follow one another. Control flow can pass from one module to the next higher numbered module unless explicitly otherwise indicated.

The identify maneuver location module 802 identifies the maneuver location 224 of FIG. 2. The navigation system 100 of FIG. 1 can use the maneuver location 224 to detect if objects near the maneuver location 224 caused the vehicle abrupt maneuver 220. The identify maneuver location module 802 can identify the maneuver location 224 by detecting the location of where the vehicle abrupt maneuver 220 of FIG. 2 occurred. The maneuver location 224 can be identified by the GPS position of the vehicle, cellular triangulation, motion sensors, or a combination thereof.

For example, when the provoked vehicle 208 of FIG. 2 swerves to avoid the lane-changing vehicle 206 of FIG. 2, the navigation system 100 can detect the vehicle abrupt maneuver 220 with motion sensors. The identify maneuver location module 802 can determine the maneuver location 224 by using the GPS position of the provoked vehicle 208 at the time of the vehicle abrupt maneuver 220.

The check proximity module 804 detects the proximity of the road hindrance 216 of FIG. 2 to the maneuver location 224 for determining the provoked maneuver 226 of FIG. 2. If the road hindrance 216 is located in the path of the navigating vehicle 210 of FIG. 2, the navigation system 100 can determine that the road hindrance 216 probably caused the provoked maneuver 226 if the proximity of the road hindrance 216 was close to the maneuver location 224. For example, the check proximity module 804 can use radar or sonar to detect the distance between the road hindrance 216 and the navigating vehicle 210 and other vehicles within the local area.

Further, for example, the road hindrance 216 can be another vehicle or the pedestrian 212 of FIG. 2 that is equipped radio frequency identification. The check proximity module 804 can determine the distance between the navigating vehicle 210 and the road hindrance 216 by using the location of the radio frequency identification to determine the proximity of the objects.

The proximity of the road hindrance 216 to the maneuver location 224 can be measured in distance units such as yards, feet, or meters. The distance between the road hindrance 216 and the maneuver location 224 can be used to determine if the potential collision 218 of FIG. 2 could have occurred. During the vehicle abrupt maneuver 220, if the road hindrance 216 is far away and out of the path of the maneuver location 224, then the road hindrance 216 will be detected as not having forced the vehicle abrupt maneuver 220. In this example, the navigation system 100 can use the check proximity module 804 to collect information for determining the unprovoked maneuver 302.

The determine cause module 806 identifies the maneuver location 224, and the location of the road hindrance 216 within the vehicle environment 214 to determine the cause 222. If the determine cause module 806 detects that the vehicle abrupt maneuver 220 was the result of the road hindrance 216, the determine cause module 806 can determine the cause 222 as the road hindrance 216. For example, if the road hindrance 216 was detected in the path of a vehicle that swerved to avoid the road hindrance 216, the determine cause module 806 can determine that the road hindrance 216 caused the vehicle to swerve.

If the road hindrance 216 was far apart from the maneuver location 224, then the determine cause module 806 can determine that the road hindrance 216 was not the cause 222. For example, the detect road hindrance module 704 of FIG. 7 can detect the road hindrance 216 as a car following 20 meters apart from the navigating vehicle 210 of FIG. 3. The abrupt maneuver module 602 of FIG. 6 can detect the vehicle abrupt maneuver 220 from the navigating vehicle 210 of FIG. 3. The determine cause module 806 can determine that the road hindrance 216 was not the cause 222 of the vehicle abrupt maneuver 220 because the road hindrance 216 was 20 meters away. The cause 222 can then be identified to be the driver of the vehicle that made the vehicle abrupt maneuver 220.

The determine classification module 808 determines the classification 304 of FIG. 3 of the vehicle abrupt maneuver 220 based on the cause 222. If the cause 222 is identified to be the result of the road hindrance 216, the determine classification module 808 can determine the provoked maneuver 226 as the classification 304. If the road hindrance 216 is not determined to be the cause 222, the determine classification module 808 can determine the unprovoked maneuver 302 as the classification 304.

For example, the vehicle abrupt maneuver 220 can be classified as the provoked maneuver 226 because the lane-changing vehicle 206 caused the provoked vehicle 208 to swerve in FIG. 2. In FIG. 3, the vehicle abrupt maneuver 220 can be classified as the unprovoked maneuver 302 of FIG. 3 because the navigating vehicle 210 swerved independently of external reasons.

The safety recommendation module 810 generates the safety recommendation 228 of FIG. 2 based on the cause 222 and the classification 304. For example, if the classification 304 was the unprovoked maneuver 302 and the cause 222 was undetermined for the navigating vehicle 210, the safety recommendation module 810 can generate the safety recommendation 228 to slow down or pull over to rest. If the classification 304 was the provoked maneuver 226, the safety recommendation module 810 can generate the safety recommendation 228 to avoid the cause 222 of the provoked maneuver 226.

The safety recommendation module 810 can access a collection of different safety messages for many different situations. The safety recommendation module 810 can assess the situation from the classification 304 and the cause 222 to determine the safety recommendation 228. For example, if the cause 222 is an approaching emergency vehicle like the emergency vehicle 405 of FIG. 4, the safety recommendation module 810 can generate the safety recommendation 228 that warns the driver to pull over to avoid the approaching driving hazard.

The generate message module 812 generates the message 230 that displays the safety recommendation 228, the classification 304, and the cause 222. The generate report module 814 can generate and transmit the report 412 of FIG. 4 to the recipient 414 of FIG. 4.

For illustrative purposes, the modules of the cause module 606 are described as discrete functional modules, although it is understood that these modules can have a different configuration. For example, the identify maneuver location module 802, the check proximity module 804, the determine cause module 806, and the determine cause module 806 can be implemented as one module or with lesser number of modules. Each of the modules can operate individually and independently of the other modules.

The cause module 606 can be implemented on the first device 102 of FIG. 5, on the second device 106 of FIG. 5, or can be partitioned between the first device 102 and the second device 106. An example for the first device 102 can have the first software 526 of FIG. 5 include the identify maneuver location module 802, the check proximity module 804, the determine cause module 806, the determine classification module 808, the safety recommendation module 810, the generate message module 812, and the generate report module 814. The first control unit 512 can execute the first software 526.

The identify maneuver location module 802 can use the location unit 520 of FIG. 5 and the first control unit 512 of FIG. 5 to identify the maneuver location 224. For example, the first control unit 512 can determine the GPS position using the location unit 520.

The check proximity module 804 can use the location unit 520 and the first control unit 512 to check the proximity of the road hindrance 216 to the maneuver location 224. The check proximity module 804 can use the location unit 520 to determine the position of the road hindrance 216 and the navigating vehicle 210. The check proximity module 804 can use the first control unit 512 to compare the maneuver location 224 to the location of the road hindrance 216. The check proximity module 804 can send this information to the determine cause module 806 to identify the cause 222.

The determine cause module 806 can use the first control unit 512 to identify the cause 222. The determine classification module 808 can use the first control unit 512 to determine the classification 304. The safety recommendation module 810 can use the first control unit 512 to generate the safety recommendation 228.

The generate report module 814 can use the first control unit 512 to generate the report 412. The generate report module 814 can also use the first communication unit 516 of FIG. 5 to transmit the report 412 to the recipient 414. The generate message module 812 can use the first display interface 630 of FIG. 6 to display the message 230.

An example for the second device 106 can have the second software 542 of FIG. 5 include the identify maneuver location module 802, the check proximity module 804, the determine cause module 806, the determine classification module 808, the safety recommendation module 810, the generate message module 812, and the generate report module 814. The second control unit 534 of FIG. 5 can execute the second software 542.

The identify maneuver location module 802 can use the second control unit 534 to identify the maneuver location 224. The check proximity module 804 can use the second control unit 534 to compare the maneuver location 224 to the location of the road hindrance 216. The check proximity module 804 can send this information to the determine cause module 806 to identify the cause 222.

The determine cause module 806 can use the second control unit 534 to identify the cause 222. The determine classification module 808 can use the second control unit 534 to determine the classification 304. The safety recommendation module 810 can use the second control unit 534 to generate the safety recommendation 228.

The generate report module 814 can use the second control unit 534 to generate the report 412. The generate report module 814 can also use the second communication unit 536 of FIG. 5 to transmit the report 412 to the recipient 414. The generate message module 812 can use the second display interface 540 of FIG. 5 to display the message 230.

In another example, the cause module 606 can be partitioned between the first device 102 of FIG. 5 and the second device 106 of FIG. 5. For example, the generate message module 812 can be partitioned on the first device 102. The generate report module 814 can use the first control unit 512 to generate the report 412. The generate report module 814 can also use the first communication unit 516 of FIG. 5 to transmit the report 412 to the recipient 414.

The identify maneuver location module 802, the check proximity module 804, the determine cause module 806, the determine classification module 808, the safety recommendation module 810, and the generate report module 814 can be partitioned on the second device 106. The identify maneuver location module 802 can use the second control unit 534 to identify the maneuver location 224.

The check proximity module 804 can use the second control unit 534 to compare the maneuver location 224 to the location of the road hindrance 216. The check proximity module 804 can send this information to the determine cause module 806 to identify the cause 222.

The determine cause module 806 can use the second control unit 534 to identify the cause 222. The determine classification module 808 can use the second control unit 534 to determine the classification 304. The safety recommendation module 810 can use the second control unit 534 to generate the safety recommendation 228.

The generate report module 814 can use the second control unit 534 to generate the report 412. The generate report module 814 can also use the second communication unit 536 of FIG. 5 to transmit the report 412 to the recipient 414. The generate message module 812 can use the second display interface 540 of FIG. 5 to display the message 230.

It has been further been discovered that the present invention provides the navigation system 100 with abrupt maneuver monitoring mechanism for improving safe driving. The navigation system 100 determines the cause 222 and the classification 304 of FIG. 3 to the vehicle abrupt maneuver 220. In determining, the cause 222 of a vehicle's swerving or dangerous maneuvers, other drivers, the police, insurance companies, and other recipients can be alerted of problems with the vehicle that made the vehicle abrupt maneuver 220. Drivers can receive the message 230 of FIG.

2 to avoid vehicles and objects that could cause accidents. The navigation system 100 can determine the classification 304 for the cause 222 of the vehicle abrupt maneuver 220 as the provoked maneuver 226 of FIG. 2 or the unprovoked maneuver 302 of FIG. 3. Based on the classification 304 and the cause 222, a specific warning of the safety recommendation 228 of FIG. 2 can be recommended thereby improving safe driving for the user of the navigation system 100 as well as other around or those that may be traveling to the location of the unprovoked maneuver 302 or the provoked maneuver 226.

For example, if the navigation system 100 detects the unprovoked maneuver 302 because the driver of the vehicle is sleepy or intoxicated, the safety recommendation 228 can suggest that the driver pull over to rest. The classification 304 and the cause 222 of potential accidents can be sent to interested parties such as parents, police, and insurance companies in the report 412.

It has been unexpectedly found that the vehicle environment 214, the road hindrance 216, and the vehicle abrupt maneuver 220 can be monitored to provide many new tools in keeping roads safer. The navigation system 100 can detect causes of dangerous driving from a driver's vehicle and other vehicles on the road. The navigation system 100 can also provide alerts in the message 230 and the safety recommendation 228 to avoid specific objects that may cause an accident such as the pedestrian 212 of FIG. 2, animals, tree branches, and other obstructions.

The physical transformation of the vehicle environment 214, the road hindrance 216, the vehicle abrupt maneuver 220, the cause 222, and the classification 304 results in movement in the physical world, such as people using the first device 102 or vehicles, based on the operation of the navigation system 100. As the movement in the physical world occurs, the movement itself creates additional information that is converted back to the vehicle environment 214, the road hindrance 216, the vehicle abrupt maneuver 220, the cause 222, and the classification 304 for the continued operation of the navigation system 100 and to continue the movement in the physical world.

Thus, it has been discovered that the navigation system 100 of the present invention furnishes important and heretofore unknown and unavailable solutions, capabilities, and functional aspects for a navigation system for monitoring people and objects.

Figure 9:
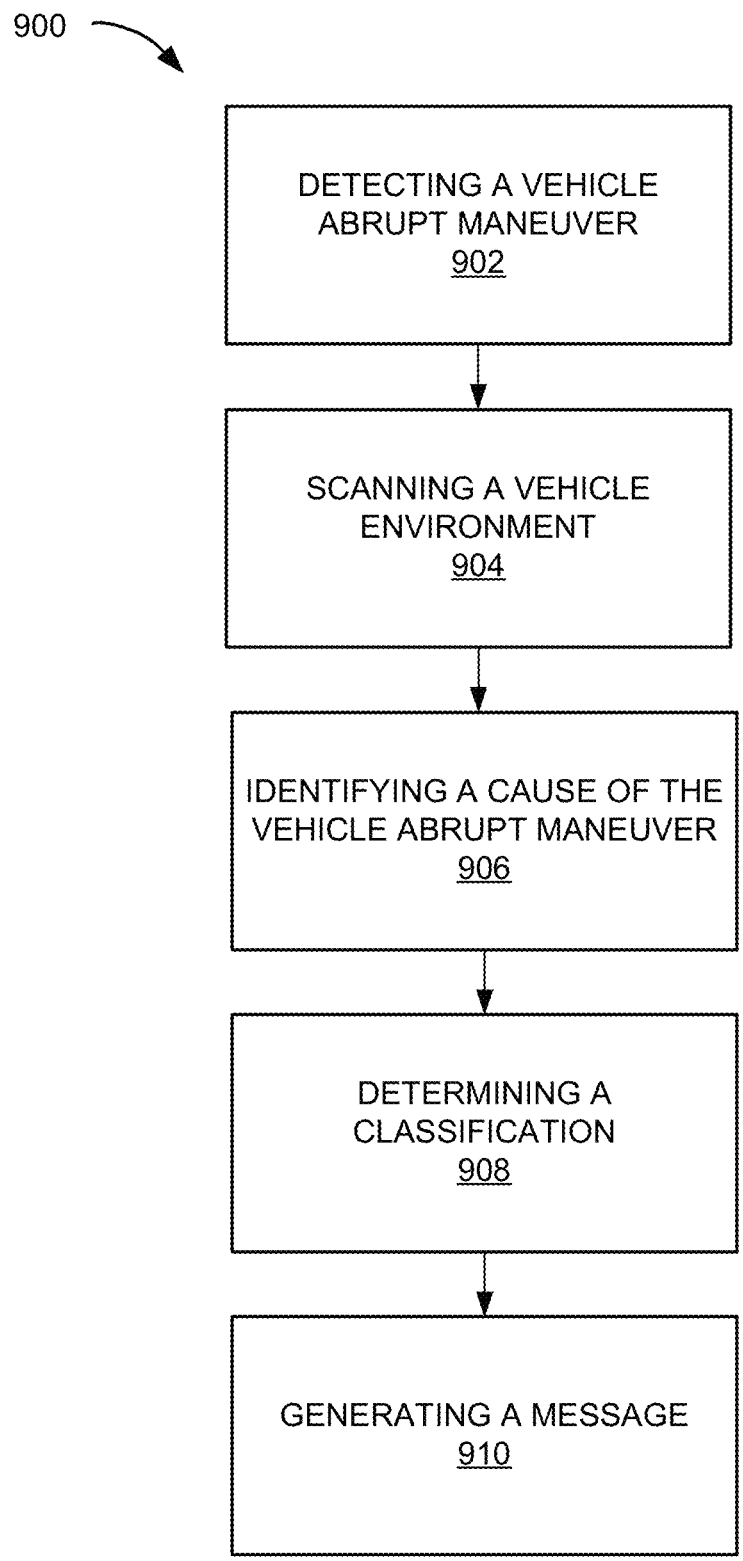
FIG. 9 is a flow chart of a method of operation of a navigation system in a further embodiment of the present invention.

Referring now to FIG. 9, therein is shown a flow chart of a method 900 of operation of a navigation system in a further embodiment of the present invention. The method 900 includes: detecting a vehicle abrupt maneuver in a block 902; scanning a vehicle environment for a road hindrance in a block 904; identifying a cause of the vehicle abrupt maneuver based on the vehicle environment in a block 906, determining a classification as a provoked maneuver or an unprovoked maneuver based on the cause in a block 908; and generating a message based on the classification and the cause for displaying on a device in a block 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   detecting a vehicle abrupt maneuver based on a direction of a vehicle trajectory returning to a previous vehicle's course after the vehicle abrupt maneuver;
   analyzing a vehicle environment for a road hindrance based on filtering the road hindrance by adjusting a scanning range of the vehicle environment wherein one instance of the scanning range is different from another instance of the scanning range depending on a severity of traffic situations further wherein the scanning range for a traffic situation covers a distance shorter and an area less than a distance and an area covered by the scanning range for a different traffic situation determined to be lighter;
   identifying a cause of the vehicle abrupt maneuver based on the vehicle environment;
   determining with a control unit a classification as a provoked maneuver or an unprovoked maneuver based on the cause, wherein;
      the provoked maneuver is for representing a situation where the vehicle abrupt maneuver was to avoid the road hindrance,
      the unprovoked maneuver is for representing the situation where the vehicle abrupt maneuver was made without a presence of the road hindrance;
   operating a plurality of safety cameras, including a first safety camera and a second safety camera, after the provoked maneuver or the unprovoked maneuver for identifying a hindrance type wherein the hindrance type represents a category of the road hindrance including an object on a road, and further wherein the first safety camera, operated by the navigation system, is mounted on a vehicle connected to the navigation system and the second safety camera, operated by a municipal transportation agency, is mounted on a tower to monitor for the road hindrance that forced the provoked maneuver for the continued operation of the navigation system; and
   generating a message based on the classification, the hindrance type, and the cause for presenting the message including a safety recommendation specific for the provoked maneuver or the unprovoked maneuver and the hindrance type of the road hindrance.

2. The method as claimed in claim 1 wherein identifying the cause of the vehicle abrupt maneuver based on the vehicle environment includes:
   identifying a maneuver location for the vehicle abrupt maneuver; and
   detecting the road hindrance in proximity to the maneuver location.

3. The method as claimed in claim 1 wherein determining the classification as the provoked maneuver or unprovoked maneuver includes:
   detecting the road hindrance as the cause of the vehicle abrupt maneuver; and determining the classification as the provoked maneuver based on the cause.

4. The method as claimed in claim 1 wherein determining the classification as the provoked maneuver or unprovoked maneuver includes:
   identifying the road hindrance as not the cause based on the road hindrance and a maneuver location; and
   determining the classification as the unprovoked maneuver.

5. The method as claimed in claim 1 further comprising generating a report containing the cause, the classification, or a combination thereof.

6. A method of operation of a navigation system comprising:
   detecting a vehicle abrupt maneuver based on a direction of a vehicle trajectory returning to a previous vehicle's course after the vehicle abrupt maneuver and a maneuver location;
   detecting a maneuver location;
   analyzing a vehicle environment for a road hindrance based on filtering the road hindrance by adjusting a scanning range of the vehicle environment wherein one instance of the scanning range is different from another instance of the scanning range depending on a severity of traffic situations further wherein the scanning range for a traffic situation covers a distance shorter and an area less than a distance and an area covered by the scanning range for a different traffic situation determined to be lighter;
   identifying a cause of the vehicle abrupt maneuver based on the maneuver location and the road hindrance;
   determining with a control unit a classification as a provoked maneuver or an unprovoked maneuver based on the cause, wherein;
      the provoked maneuver is for representing a situation where the vehicle abrupt maneuver was to avoid the road hindrance;
      the unprovoked maneuver is for representing the situation where the vehicle abrupt maneuver was made without a presence of the road hindrance;
   operating a plurality of safety cameras, including a first safety camera and a second safety camera, after the provoked maneuver or the unprovoked maneuver for identifying a hindrance type wherein the hindrance type represents a category of the road hindrance including an object on a road, and further wherein the first safety camera, operated by the navigation system, is mounted on a vehicle connected to the navigation system and the second safety camera, operated by a municipal transportation agency, is mounted on a tower to monitor for the road hindrance that forced the provoked maneuver for the continued operation of the navigation system;
   generating a report containing the cause and the classification; and
   generating a message based on the classification, the hindrance type, and the cause for presenting the message including a safety recommendation specific for the provoked maneuver or the unprovoked maneuver and the hindrance type of the road hindrance.

7. The method as claimed in claim 6 further comprising:
   scanning the vehicle environment for the road hindrance includes identifying the hindrance type for the road hindrance; and
   wherein:
      generating the message based on the classification includes generating the message to avoid the hindrance type.

8. The method as claimed in claim 6 wherein generating the message includes generating the safety recommendation to avoid the road hindrance.

9. The method as claimed in claim 6 further comprising:
   identifying the road hindrance as not related to the cause based on the vehicle abrupt maneuver and the maneuver location; and
   wherein:
      determining the classification includes determining the classification as the unprovoked maneuver; and
      generating the message includes generating the safety recommendation to slow down, pull over, or a combination thereof.

10. The method as claimed in claim 6 further comprising requesting information from the first safety camera to monitor the vehicle environment.

11. A navigation system comprising:
    a storage unit including memory and configured to provide access to software;
    a control unit including at least one processor, coupled to the storage unit, configured to execute the software to:
       detect a vehicle abrupt maneuver based on a direction of a vehicle trajectory returning to a previous vehicle's course after the vehicle abrupt maneuver;
       analyze a vehicle environment for a road hindrance based on filtering the road hindrance by adjusting a scanning range of the vehicle environment wherein one instance of the scanning range is different from another instance of the scanning range depending on a severity of traffic situations further wherein the scanning range for a traffic situation covers a distance shorter and an area less than a distance and an area covered by the scanning range for a different traffic situation determined to be lighter;
       identify a cause of the vehicle abrupt maneuver based on the vehicle environment; determine a classification as a provoked maneuver or an unprovoked maneuver based on the cause;
       operate a plurality of safety cameras, including a first safety camera and a second safety camera, after the provoked maneuver or the unprovoked maneuver for identifying a hindrance type wherein the hindrance type represents a category of the road hindrance including an object on a road, and further wherein the first safety camera, operated by the navigation system, is mounted on a vehicle connected to the navigation system and the second safety camera, operated by a municipal transportation agency, is mounted on a tower to monitor for the road hindrance that forced the provoked maneuver for the continued operation of the navigation system; and
       generate a message based on the classification, the hindrance type, and the cause for presenting the message including a safety recommendation.

12. The system as claimed in claim 11 wherein the control unit is configured to further execute the software to:
    identify a maneuver location for the vehicle abrupt maneuver;
    detect the road hindrance in proximity to the maneuver location; and
    determine the cause based on the vehicle abrupt maneuver, the maneuver location, and the road hindrance in proximity to the maneuver location.

13. The system as claimed in claim 11 wherein the control unit is configured to further execute the software to:
    detect the road hindrance as the cause of the vehicle abrupt maneuver; and determine the classification as the provoked maneuver based on the cause.

14. The system as claimed in claim 11 wherein the control unit is configured to further execute the software to:
   identify the road hindrance as not the cause based on the road hindrance and a maneuver location; and
   determine the classification as the unprovoked maneuver.

15. The system as claimed in claim 11 wherein the control unit is configured to further execute the software to generate a report containing the cause, the classification, or a combination thereof for a recipient.

16. The system as claimed in claim 11 wherein the control unit is configured to further execute the software to:
   determine the vehicle abrupt maneuver and the maneuver location;
   identify the cause of the vehicle abrupt maneuver based on the maneuver location and the road hindrance; and
   generate a report containing the cause and the classification.

17. The system as claim in claim 16 wherein the control unit is configured to further execute the software to:
   identify the hindrance type for the road hindrance; and
   generate the message to avoid the hindrance type.

18. The system as claim in claim 16 wherein the control unit is configured to further execute the software to generate the safety recommendation to avoid the road hindrance.

19. The system as claim in claim 16 wherein the control unit is configured to further execute the software to:
   identify the road hindrance as not related to the cause based on the vehicle abrupt maneuver and the maneuver location;
   determine the classification as the unprovoked maneuver; and
   generate the safety recommendation to slow down, pull over, or a combination thereof.

20. The system as claim in claim 16 wherein the control unit is configured to further execute the software to request information from the first safety camera to monitor the vehicle environment.

* * * * *